United States Patent
Sibener et al.

(10) Patent No.: US 11,413,579 B2
(45) Date of Patent: Aug. 16, 2022

(54) SEPARATION OF ISOTOPES IN SPACE AND TIME BY GAS-SURFACE ATOMIC DIFFRACTION

(71) Applicant: The University of Chicago, Chicago, IL (US)

(72) Inventors: Steven J. Sibener, Chicago, IL (US); Jacob D. Graham, Chicago, IL (US); Kevin J. Nihill, Chicago, IL (US)

(73) Assignee: The University of Chicago, Chicago, IL (US)

( * ) Notice: Subject to any disclaimer, the term of this patent is extended or adjusted under 35 U.S.C. 154(b) by 479 days.

(21) Appl. No.: 16/612,872

(22) PCT Filed: May 17, 2018

(86) PCT No.: PCT/US2018/033145
§ 371 (c)(1),
(2) Date: Nov. 12, 2019

(87) PCT Pub. No.: WO2018/213549
PCT Pub. Date: Nov. 22, 2018

(65) Prior Publication Data
US 2020/0139302 A1    May 7, 2020

Related U.S. Application Data

(60) Provisional application No. 62/508,836, filed on May 19, 2017.

(51) Int. Cl.
*B01D 59/00* (2006.01)
*B01D 59/34* (2006.01)
(Continued)

(52) U.S. Cl.
CPC ............... *B01D 59/34* (2013.01); *G21K 1/06* (2013.01); *G21K 1/10* (2013.01)

(58) Field of Classification Search
CPC ........ B01D 59/34; B01D 59/00; B01D 57/00; B01D 50/00; B01D 53/00; B01D 59/48;
(Continued)

(56) References Cited

U.S. PATENT DOCUMENTS 4,025,790 A    5/1977    Jetter et al.
4,119,509 A    10/1978    Szoke
(Continued)

FOREIGN PATENT DOCUMENTS

WO    WO 2019/032223    2/2019

OTHER PUBLICATIONS

"Isotope separation in supersonic molecular beams using rf spectroscopy", Aviv Amirav and Uzi Even, Jul. 9, 2008, Journal of Applied Physics 51, 1 (1980) (Year: 2008).*
(Continued)

*Primary Examiner* — Don K Wong
(74) *Attorney, Agent, or Firm* — Bell & Manning, LLC (57) ABSTRACT

Methods for separating isotopes are provided. An embodiment of such a method comprises directing a supersonic beam characterized by an average velocity v and velocity distribution Δv/v, the beam comprising a first isotope and a second isotope, at a single-crystalline surface at an angle of incidence $\theta_i$ such that the first isotope elastically scatters from the surface with a peak angle $\theta_{f1}$ and the second isotope elastically scatters from the surface with a peak angle $\theta_{f2}$; and selectively collecting the scattered first isotope, the scattered second isotope, or both. Apparatus for carrying out the methods are also provided.

18 Claims, 6 Drawing Sheets

(51) Int. Cl.
*G21K 1/06* (2006.01)
*G21K 1/10* (2006.01)

(58) Field of Classification Search
CPC ........ B01D 2257/304; B01D 2257/502; B01D 49/006; B01D 59/44; B01J 19/087; B01J 19/121; B01J 19/002; B01J 19/10; B01J 19/123; B03C 1/30; B03C 1/023; G12K 1/10; G21K 1/06
See application file for complete search history.

(56) References Cited

U.S. PATENT DOCUMENTS

| | | |
|---|---|---|
| 4,199,679 A | 4/1980 | Ami-Rav |
| 4,386,274 A | 5/1983 | Altshuler |
| 2002/0166960 A1 | 11/2002 | Pronko et al. |
| 2014/0245885 A1 | 9/2014 | Rowe et al. |

OTHER PUBLICATIONS

G. Boato et al., "A Study of the (001) LiF Surface at 80 K by Means of Diffractive Scattering of He and Ne Atoms at Thermal Energies," Surface Science 1976, vol. 55, pp. 141-178.
The International Search Report and Written Opinion issued in International Patent Application No. PCT/US2018/033145 dated Sep. 24, 2018, pp. 1-9.
Kevin J. Nihill et al., "Separation of Isotopes in Space and Time by Gas-Surface Atomic Diffraction," Physical Review Letters 2017, vol. 119, p. 176001-1-176001-5.
The International Search Report and Written Opinion issued in International Patent Application No. PCT/US2018/040609 dated Jan. 25, 2019, pp. 1-7.

* cited by examiner

SEPARATION OF ISOTOPES IN SPACE AND TIME BY GAS-SURFACE ATOMIC DIFFRACTION

CROSS REFERENCE TO RELATED APPLICATIONS

This application is a National Stage of International Application No. PCT/US2018/033145, filed May 17, 2018, which claims the benefit of U.S. Patent Application No. 62/508,836, filed May 19, 2017, the contents of which are hereby incorporated by reference.

REFERENCE TO GOVERNMENT RIGHTS

This invention was made with government support under Grant No. FA9550-15-1-0428 awarded by the Air Force Office of Scientific Research. The government has certain rights in the invention.

BACKGROUND

Proposals for separating and enriching isotopes came about almost immediately after isotopes were discovered. In 1919, Lindemann and Aston examined a vast array of possible methods including fractional distillation, chemical separation, gaseous diffusion, and gravitational and centrifugal separation, along with separation of positive ions with electric and magnetic fields (1). Their early analysis concluded that isotopes "must be separable in principle though possibly not in practice." The Manhattan Project in the 1940s ushered in large scale practical implementation of many of these techniques. Fractional distillation, gaseous diffusion and magnetic sector mass spectrometers (Calutrons) were all used on an industrial scale to enrich $^{23}U$ (2, 3). Today, isotope separation and enrichment underpin advanced technologies in a wide variety of fields, including isotopic labeling in the life sciences and radioisotopes in medicine. Microelectronics may also begin to utilize isotopic enrichment as isotopically enriched materials have increased thermal conductivity and electron transport properties, as well as improved spin properties for quantum information platforms (4-6). Gaseous diffusion, distillation and gas centrifuges exhibit small isotopic separation effects which are overcome through large scale installations where many separation steps are performed in sequence. Alternatively, laser-based techniques such as atomic vapor laser isotope separation (AVLIS) and magnetically activated and guided isotope separation (MAGIS) can separate isotopes to a much higher degree, but require ionization or excitation of the target isotope (7, 8).

SUMMARY

Provided are systems and methods for separating isotopes. The systems and methods are based on supersonic beam diffraction.

In one aspect, method for separating isotopes are provided. An embodiment of such a method comprises directing a supersonic beam characterized by an average velocity v and velocity distribution $\Delta v/v$, the beam comprising a first isotope and a second isotope, at a single-crystalline surface at an angle of incidence $\theta_i$ such that the first isotope elastically scatters from the surface with a peak angle $\theta_{f1}$ and the second isotope elastically scatters from the surface with a peak angle $\theta_{f2}$; and selectively collecting the scattered first isotope, the scattered second isotope, or both.

In another aspect, apparatus for carrying out the methods are provided. An embodiment of such an apparatus comprises a source configured to provide a supersonic beam characterized by an average velocity v and velocity distribution $\Delta v/v$, the beam comprising a first isotope and a second isotope, wherein the apparatus is further configured to direct the supersonic beam at a single-crystalline surface at an angle of incidence $\theta_i$ such that the first isotope elastically scatters from the surface with a peak angle $\theta_{f1}$ and the second isotope elastically scatters from the surface with a peak angle $\theta_{f2}$; and a collector configured to selectively collect the scattered first isotope, the scattered second isotope, or both, as a function of angle $\theta_f$ or time-of-flight, or both.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

DETAILED DESCRIPTION

Provided are systems and methods for separating isotopes. The systems and methods are based on supersonic beam diffraction. The systems and methods may be used to separate isotopes, e.g., $^{22}Ne$ and $^{20}Ne$, by diffracting a monovelocity supersonic beam of an isotopically mixed gas from a crystalline surface (e.g., $CH_3$—Si(111)). The isotopes do not need to be the same element, but only need to differ in atomic mass. The relative abundances in the native mixture can be determined from the relative intensities of their respective diffraction peaks.

In an embodiment, a method for separating isotopes comprises directing a supersonic beam characterized by an average velocity v and velocity distribution $\Delta v/v$, the beam comprising a first isotope and a second isotope, at a surface of a crystal at an angle of incidence $\theta_i$ such that the first isotope elastically scatters from the surface with a peak angle $\theta_{f1}$ and the second isotope elastically scatters from the surface with peak angle $\theta_{f2}$; and selectively collecting the scattered first isotope, the scattered second isotope or both.

Figure 6:
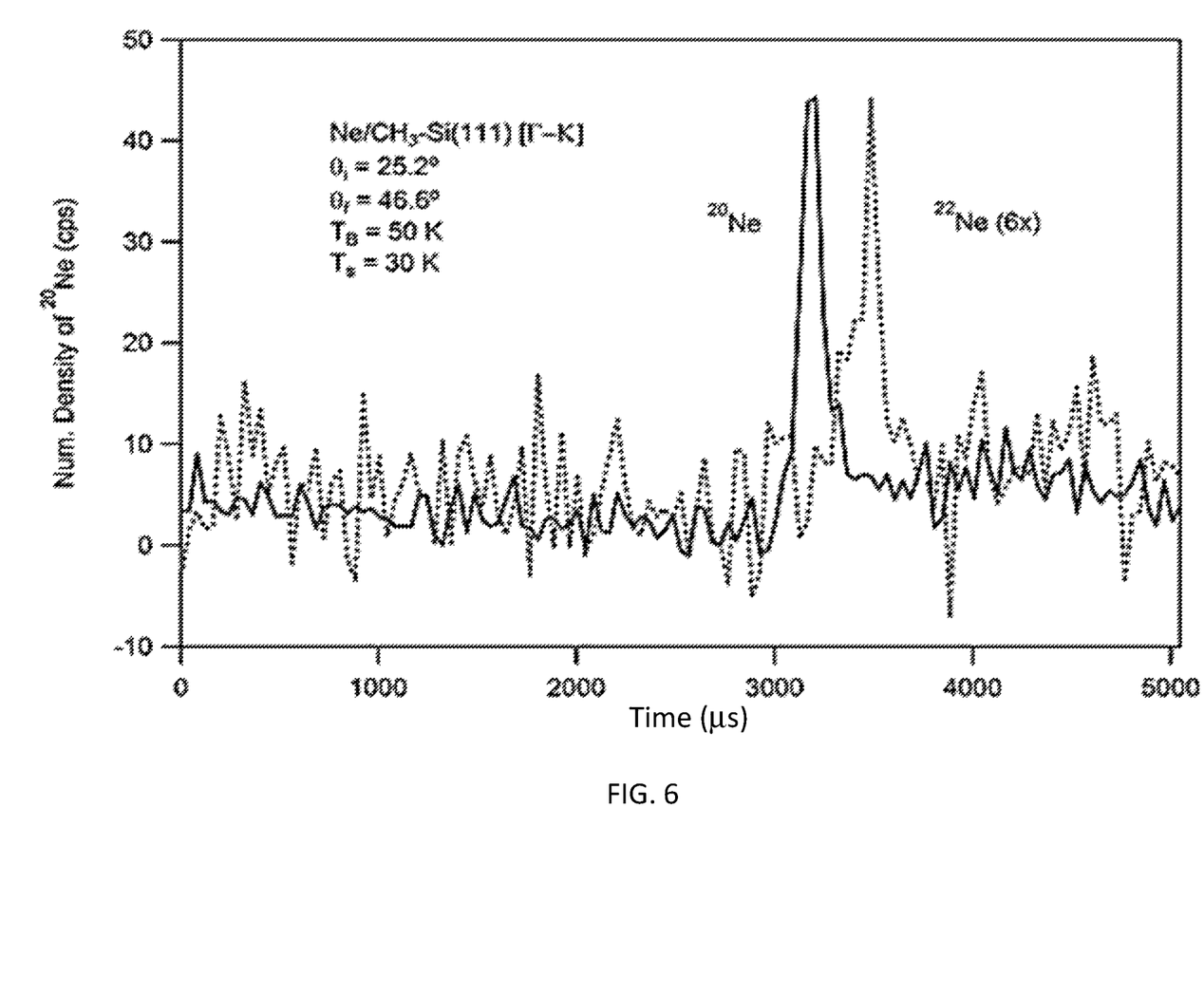
FIG. 6 shows time-of-flight spectra for $^{20}Ne$ (solid line) and $^{22}Ne$ (dashed line) demonstrating temporal separation of the two isotopes at a specified final angle.

The peak angles $\theta_{f1}$ and $\theta_{f2}$ differ, thereby providing separation of the isotopes in space. (See FIG. 4.) In addition, at a given $\theta_f$, kinematic conditions dictate that the isotopes of interest must have different velocities (see FIG. 6), therefore providing separation of the isotopes in time. In other words, the method achieves both angular and temporal separation. Such separation is the basis of the selective collection of the isotopes as further described below.

The supersonic beam may be generated by a variety of atomic or molecular beam sources configured to supersonically expand a gas through a variable temperature nozzle. The gas comprises the first and second isotope. By "first and second isotope" it is meant elements which differ in atomic mass. The first and second isotope could be, but need not be, the same element. The gas may comprise additional isotopes, each isotope of which may be separated using the method.

The composition of the gas and the type of isotopes are not particularly limited. However, as atomic mass decreases, the mass separation between the target isotopes increases. Thus, the method is particularly suitable for elements or molecules having an atomic mass of 50 AMU or less. This includes elements or molecules having an atomic mass of 40 AMU or less. Illustrative examples include isotopes of hydrogen ($^1$H, $^2$H, and $^3$H), helium ($^3$He and $^4$He), lithium ($^6$Li and $^7$Li), boron ($^{10}$B and $^{11}$B), carbon ($^{12}$C, $^{13}$C, and $^{14}$C), nitrogen ($^{14}$N and $^{15}$N), oxygen ($^{16}$O, $^{17}$O, and $^{18}$O), magnesium ($^{24}$Mg, $^{25}$Mg, and $^{26}$Mg), silicon ($^{28}$Si, $^{29}$Si, and $^{30}$Si), sulfur ($^{32}$S, $^{33}$S, $^{34}$S, and $^{36}$S), chlorine ($^{35}$Cl and $^{37}$Cl), argon ($^{36}$Ar, $^{38}$Ar, and $^{40}$Ar) and potassium ($^{39}$K, $^{40}$K, and $^{41}$K). Illustrative examples of low molecular mass molecules include $^1$H$^1$H, $^2$H$^2$H, and $^1$H$^2$H; $^{12}$CH$_4$, $^{13}$CH$_4$, and $^{14}$CH$_4$; $^{14}$N$^{14}$N and $^{15}$N$^{15}$N; $^{16}$O$^{16}$O, $^{18}$O$^{18}$O, and $^{16}$O$^{18}$O; $^6$Li$^1$H and $^7$Li$^1$H; $^{35}$Cl$^1$H and $^{37}$Cl$^1$H; $^{14}$N$^1$H$_3$ and $^{15}$N$^1$H$_3$; $^1$H$^{19}$F and $^2$H$^{19}$F; $^{28}$Si$^1$H$_4$, $^{29}$Si$^1$H$_4$, and $^{30}$Si$^1$H$_4$.

The velocity distribution of the beam may be selected (e.g., minimized) to increase (e.g., maximize) the separation of the isotopes. In embodiments, the velocity distribution is no more than 1%, no more than 3%, no more than 5%, no more than 7%, no more than 9%, or in the range of from 1% to 10%. Similarly, the average velocity of the beam may be selected (e.g., minimized) to increase (e.g., maximize) the separation of the isotopes. The selected average velocity will depend upon the isotopes to be separated as well as the crystal surface. However, by way of illustration, in embodiments involving the separation of $^{20}$Ne and $^2$Ne, suitable average velocities include those of no more than 360 m/s, no more than 400 m/s, no more than 425 m/s, no more than 450 m/s, no more than 475 m/s, or in the range of from 360 m/s to 510 m/s. Adjustment of the velocity distribution and average velocity may be accomplished by beam seeding and/or in-line velocity selectors. The supersonic beam may be pulsed, e.g., via mechanical chopping.

A wide variety of crystals may be used. The crystal is single-crystalline by which it is meant that the extended crystal lattice of the solid is substantially continuous and substantially unbroken with few or substantially no grain boundaries. The crystal may be characterized by its surface atom spacing. The surface atom spacing may be selected (e.g., minimized) in order to increase (e.g., maximize) the separation of the isotopes. In embodiments, the surface atom spacing is no more than 2.5 Å, no more than 3.5 Å, no more than 4.5 Å, no more than 5.5 Å, no more than 7.0 Å, or in the range of 2.5 Å to 7.5 Å. The crystal may be characterized by its Debye temperature, or stiffness. The Debye temperature may be selected (e.g., maximized) in order to increase (e.g., maximize) the flux of separated isotopes. In embodiments, the Debye temperature is at least 100 K, at least 250 K, at least 500 K, at least 750 K, at least 950 K, or in the range of from 100 K to 1000 K.

Illustrative crystals include diamond, hydrogen terminated diamond, graphite, graphene, CH$_3$—Si(111), CH$_3$—Ge(111), LiF, NaCl, GaAs, Ni, Pt, and Au as well as, for example, O or H covered crystalline metallic surfaces, and crystallized self-assembled molecular interfaces including self-assembled alkane thiols. The selection of the crystal is determined, at least in part, so that it is inert with respect to the isotopes to be separated. By way of illustration, NaCl or LiF are suitable crystals for separating isotopes of O$_2$, while graphite is not since graphite and atomic oxygen react. The crystals NaCl or LiF will also work in separating isotopes of HCl and HF.

Selective collection of separated isotopes may be carried out as follows. In one embodiment, for collecting diffracted beams emerging from the surface of the crystal at $\theta_{f1}$ and $\theta_2$, two adjacent apertures are used. These two apertures are placed at each diffraction angle $\theta_{f1}$, $\theta_{f2}$ to capture each of the diffracted beams, respectively. The width of each aperture may be selected to maximize the collection of the desired isotope over the other isotopes. Each aperture then leads to a separate vacuum chamber that is pumped by a high vacuum pump where the exhaust of each high vacuum pump contains each diffracted beam's contents.

In an alternative embodiment, a method of collecting the diffracted beams involves two cryogenically cooled surfaces placed at $\theta_{f1}$ and $\theta_{f2}$, respectively. Isotopes, e.g., neon atoms, striking a surface below 7 Kelvin will condense and remain frozen on the surface. As the collection surfaces are filled with condensed isotopes they may periodically be warmed up to release the trapped isotopes.

Thus, selective collection involves some surface which receives a diffracted beam containing the separated isotope of interest, e.g., an aperture coupled to a vacuum chamber or a cryogenically cooled surface. The surface that receives the diffracted beam may also be an active surface of a detector such as the mass spectrometer detector described in the Example, below. Thus, any of these surfaces and similar surfaces may be referred to as "collection surfaces" and the assembly of components including the collection surfaces may be referred to as a "collector," as further described below. Also, in embodiments, "collection" encompasses "detection."

The phrase "selective collection" is used in reference to the fact that different isotopes in a mixture can be selectively collected (i.e., collected with specificity) from the mixture since the present method achieves separation in both space and time, as described above. In turn, the collection conditions for each isotope in a mixture of isotopes can be separately optimized so as to improve (e.g., maximize) collection of each isotope at its optimized condition. These "conditions" can include collection at a specific $\theta_f$ as described above. These conditions can also refer to collection over an angular width (or aperture width) and/or collection of isotopes at a specific time-of-flight or range of times-of-flight. The ability to achieve selective collection by the present method can be quantified via an enrichment factor, e.g., the factor by which a desired isotope is enriched in the material collected. By way of illustration, the Example below finds that the enrichment factor for detecting $^{22}$Ne in a neon beam containing $^{22}$Ne and $^{20}$Ne at their natural abundances is about 3.5. In other embodiments, the method may be characterized by the ability to achieve an enrichment factor for a selected isotope of at least 1.01, at least 2, at least 3, at least 5, at least 7, at least 9, or at least 10.

The method may be characterized by the ability to achieve an angular resolution, i.e., $\Delta(\theta_{f1}-\theta_{f2})$, of at least 0.1°, at least 0.5°, at least 1.0°, at least 1.5°, or at least 2°.

The methods may be carried out using an apparatus comprising a source of the supersonic beam, components configured to mount the crystal and direct the beam as described above, and a collector. (See FIG. 1B.) The collector comprises any of the collection surfaces described above. Thus, the collector could be an assembly comprising the apertures/vacuum chambers, an assembly comprising the cryogenically cooled surface, or a mass spectrometer as described above. Such an apparatus may further comprise any of the components typically associated with atomic or molecular beam sources.

Example

This example uses supersonic beam diffraction as an isotope separation technique. Among isotopic separation methods, supersonic beam diffraction has the unique combination of being a non-ionizing/dissociative process that can achieve high separation effects. This high degree of separation is only achievable via the narrow velocity distribution of a supersonic beam, which translates into a narrow angular distribution that is scattered from a highly periodic surface. While effusive beam sources have been used for atomic and molecular diffraction since pioneering experiments in the 1930s, a very small percentage of the beam flux is within a few percent of the mean beam velocity (9), preventing any meaningful degree of isotopic purification by atomic diffraction. In contrast, the advent of supersonic nozzle sources with high Mach numbers affords considerably smaller velocity distributions—here, as low as $\Delta v/v \sim 6\%$. Such narrow velocity distributions, when coupled with a high-quality, high Debye temperature surface, make separation of atomic isotopes via atomic diffraction feasible.

Figure 1A:
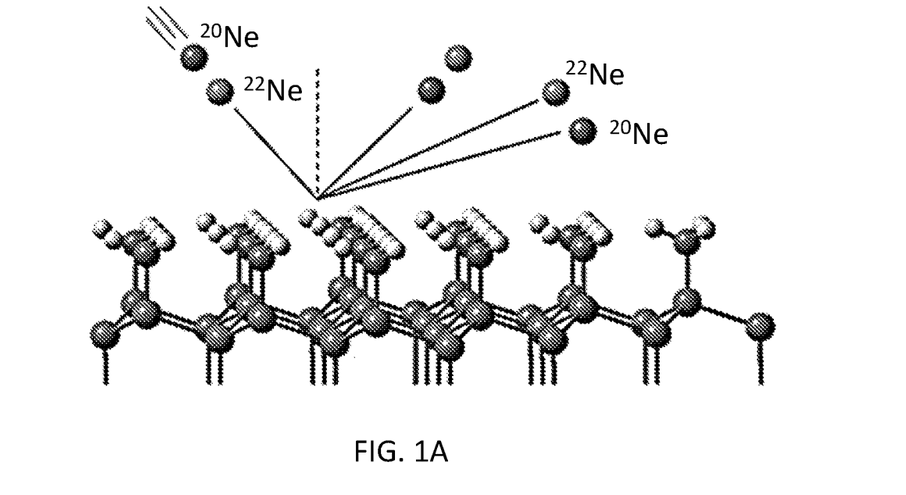
FIG. 1A shows an illustration of a monoenergetic beam of $^{20}Ne$ and $^{22}Ne$ diffracting from $CH_3$—Si(111).

The existence of isotopically unique diffraction channels for neon scattering from LiF(001) has been contemplated, but the feature was not resolved (10), nor has there been any consideration of either enrichment or separation, nor of time separation. Here, the separation of the $^{20}$Ne and $^{22}$Ne isotopes via atomic diffraction is observed for the first time when a neon beam with a natural abundance of each isotope is scattered from a methyl-terminated Si(111) surface as shown schematically in FIG. 1A. When paired with the extreme sensitivity of scattered angle with respect to the mass differences of the incident atoms, diffraction experiments may be used as an isotopic separation technique.

Methods

Figure 1B:
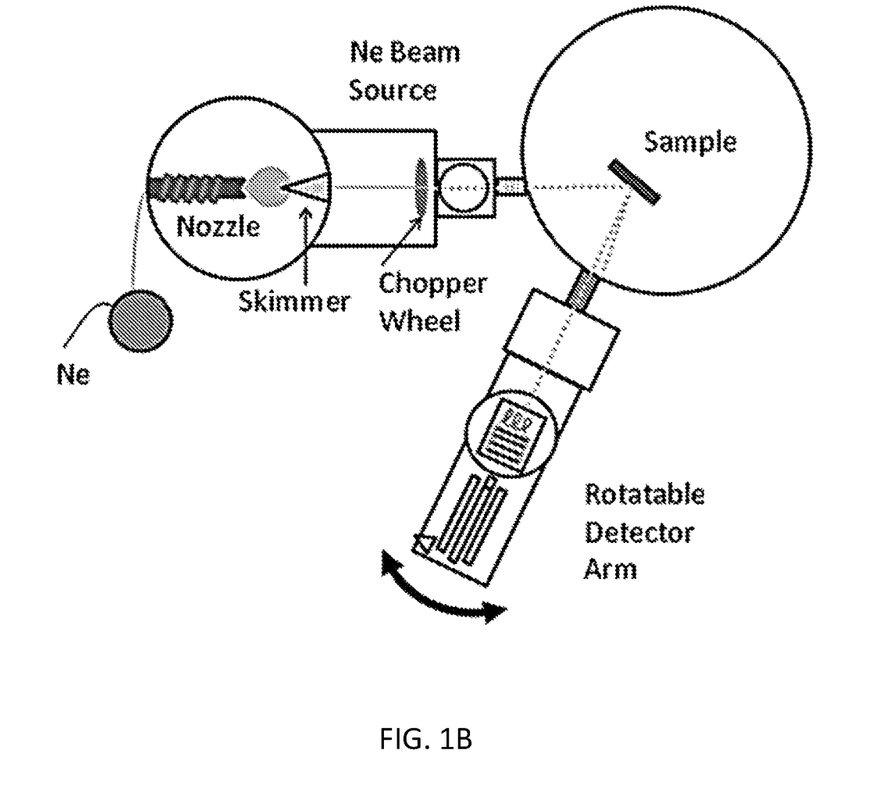
FIG. 1B is a schematic of the ultra-high vacuum surface scattering instrument employed in the Example, below.

The ultra-high vacuum (UHV) scattering apparatus required for this experiment is illustrated in FIG. 1B, and has been described in greater detail elsewhere (11). Briefly, it is comprised of three primary sections: a differentially pumped beam source, a UHV chamber that houses the crystal, and a rotatable mass spectrometer detector. A natural abundance (90.48% $^{20}$Ne and 9.25% $^{22}$Ne) neon beam with a narrow energy distribution is generated by supersonically expanding ultra-high purity Ne gas through a 15 μm diameter nozzle source which is cooled by a closed-cycle helium refrigerator. The incident energy distribution of this beam is measured with an in-line mass spectrometer and is minimized to $\Delta v/v \sim 6\%$ by adjusting the backing pressure of Ne. Similarly, the beam energy, which is determined by the nozzle temperature, is optimized to 50 K ($E_B \sim 10$ meV) in order to limit the incident energy while avoiding the formation of clusters. For diffraction and time-of-flight measurements, a pre-collision chopper is used to modulate the beam with a duty cycle of 50%; the time-of-flight measurements are performed by modulating the beam with a pseudorandom chopping sequence for cross-correlation analysis (12). The spatial profile of the beam is minimized by collimation through a series of apertures, resulting in a 4 mm spot size on the crystal (chopper-to-crystal distance=0.4996 m). After the collision with the surface, which is mounted on a six-axis manipulator in order to control the incidence angle ($\theta_i$), azimuth ($\varphi$), and tilt ($\chi$) of the crystal, the neon atoms travel along a 0.5782 m (crystal-to-ionizer distance) triply differentially pumped rotatable detector arm with an angular resolution of 0.29° FWHM, are ionized by electron bombardment, and then pass through a quadrupole mass spectrometer (QMS) before striking an electron multiplier. The QMS is adjusted to selectively filter either the $^{20}$Ne or $^{22}$Ne isotope. The angular distributions for diffraction scans are obtained by scanning the detector at 0.1° increments over a range of 35°, all while holding the incident angle at a fixed value. Between scattering experiments, the temperature of the crystal was flashed to 200 K to eliminate unwanted surface adsorbates and maximize elastic scattered intensity.

The crystal used for the isotopic separation by diffraction, $CH_3$—Si(111), was created by the Lewis group at the California Institute of Technology (13), and shipped under argon to the University of Chicago for the neon scattering experiments. This crystal was chosen for its relatively small surface atom spacing (3.82 Å), the relatively high surface Debye temperature which limits diffusive scattering, and the high quality and long-range periodicity achieved in the synthesis of the crystal, which is described in greater detail elsewhere (14-16).

Results and Discussion

When molecules elastically scatter from a surface, they can undergo a discrete exchange of parallel momentum $\Delta K$ with the surface, as governed by the equation $$\Delta K = k_i(\sin(\theta_f) - \sin(\theta_i)), \quad (1)$$

where $k_i$ is the incident wavevector of the beam, and $\theta_i$ and $\theta_f$ are, respectively, the incident and final scattered angles of the molecular beam as measured from the surface normal. This condition for elastic diffraction is met when the change in parallel momentum is equal to a sum of the reciprocal lattice vectors b, according to the equation $$\Delta K = h\vec{b_1} + k\vec{b_2}. \quad (2)$$

As is evident from equation (1), the angular location of a diffraction peak is determined in part by its incident wavevector ($k_i$), which in turn is dependent on the velocity of the incident beam.

Figure 2A:
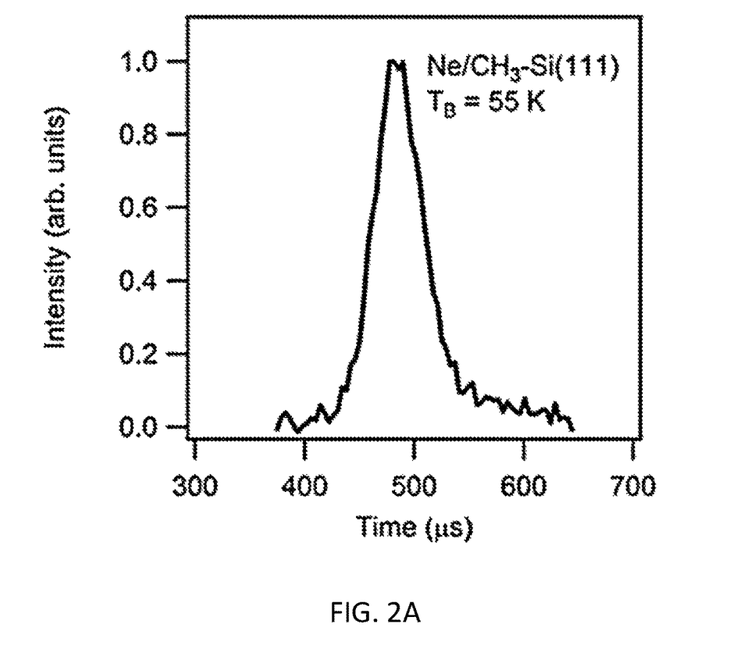
FIG. 2A shows time-of-flight and FIG. 2B shows velocity distributions of $^{20}Ne$ in a supersonic molecular beam with a nozzle temperature of 55 K.
Figure 2B:
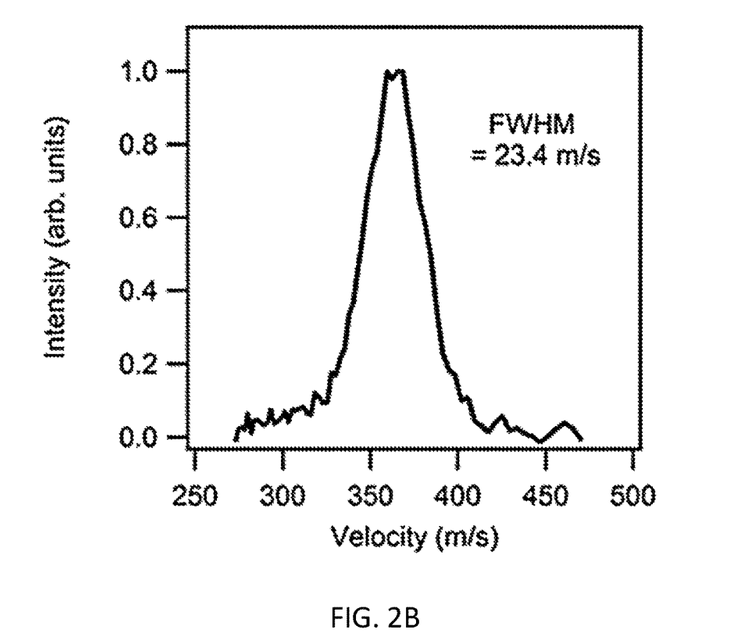
Figure 3A:
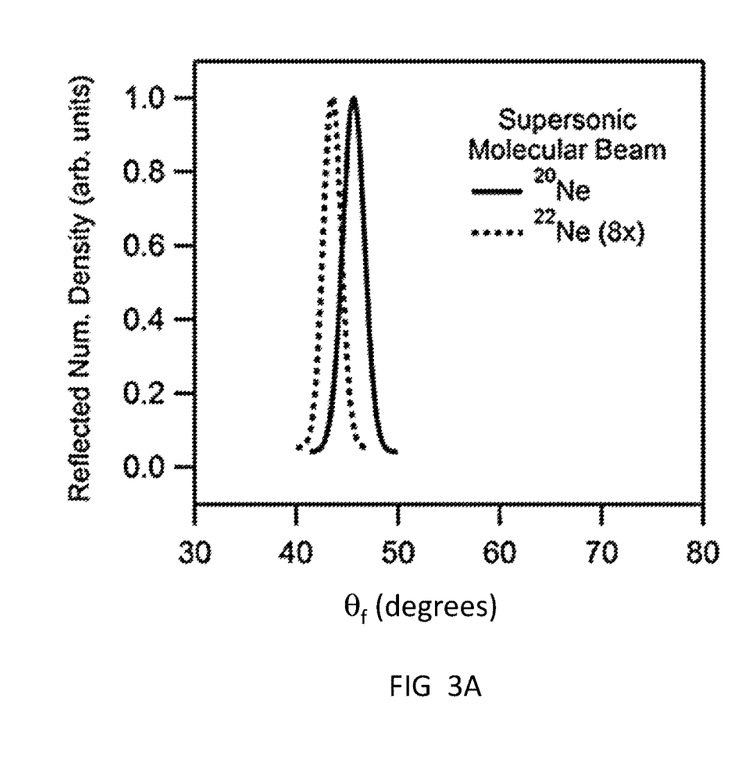
FIGS. 3A-3B show calculated angular locations of (11) diffraction peak for $^{20}Ne$ (solid line) and $^2Ne$ (dashed line) diffracted from $CH_3$—Si(111) with (FIG. 3A) a supersonic molecular beam and (FIG. 3B) an effusive source; $T_B=50$ K, $\theta_i=25.20$.
Figure 3B:
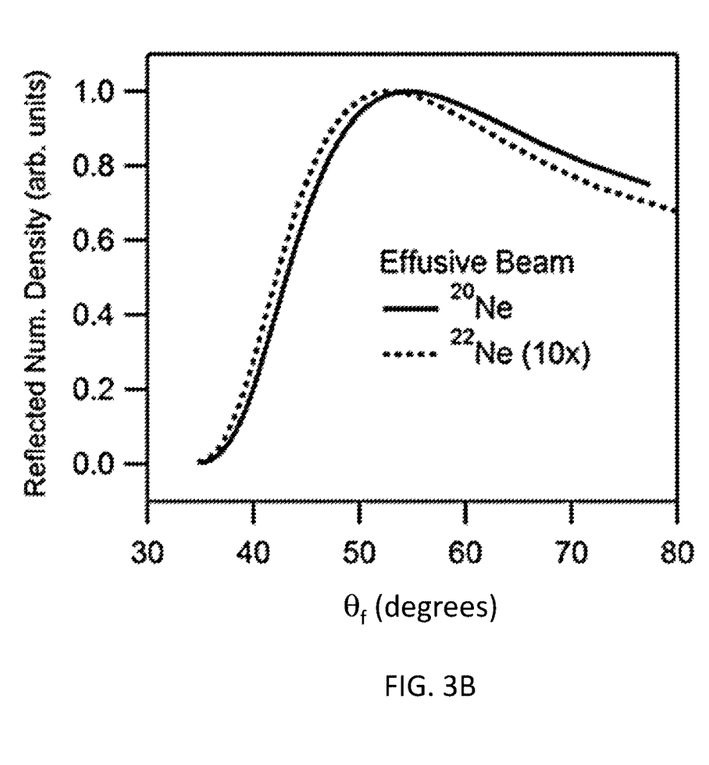

A measured time-of-flight and velocity distribution for supersonic neon is shown in FIGS. 2B and 2A, respectively. For an elastic gas-surface interaction, the incident velocity distribution of the molecular beam can be transformed into a theoretical angular distribution of the scattered beam through the implementation of equation (1). FIGS. 3A-3B show the predicted angular distribution of Ne scattered from $CH_3$—Si(111) for both an effusive (FIG. 3B) and a supersonic molecular beam (FIG. 3A).

Figure 4:
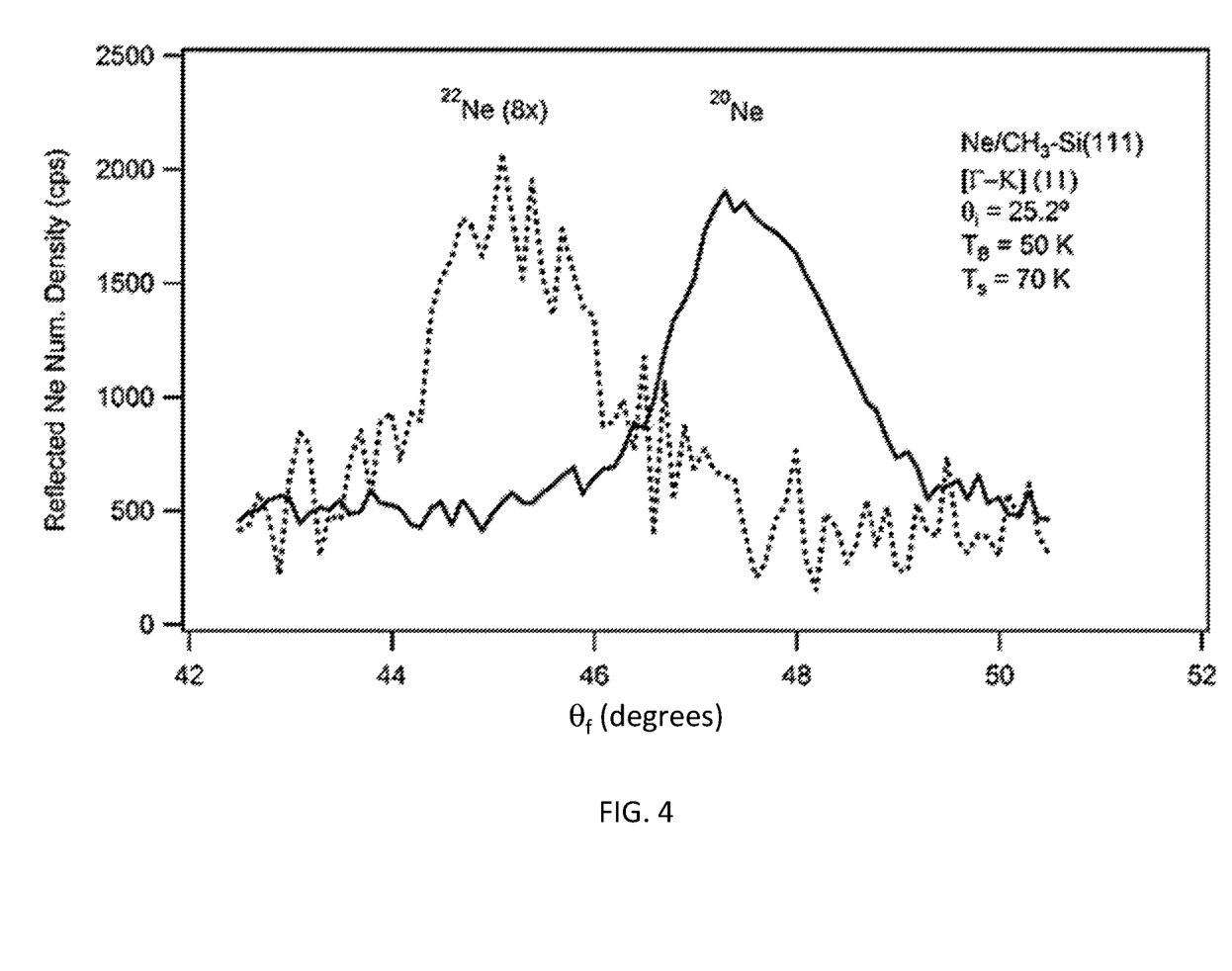
FIG. 4 shows angular separation of (11) diffraction peaks for $^{20}Ne$ (solid line) and $^{22}Ne$ (dashed line) diffracted from $CH_3$—Si(111).

Experimental angle scans of the (11) diffraction peak for $^{20}$Ne and $^{22}$Ne are shown in FIG. 4 and can be considered a figure of merit for the feasibility of separating isotopes in a supersonic beam via diffraction. These two spectra were recorded under identical incident neon beam and surface conditions and illustrate the angular separation of the isotopes observed for the (11) diffraction peak. The peak intensities observed in FIG. 4 can be used to quantify the enrichment capability of this isotope separation technique;

for these experimental conditions, a collector with an angular width of 0.67° positioned at the maximum of the $^{22}$Ne diffraction peak yields neon with an abundance of 67.6% $^{20}$Ne and 32.4% $^{22}$Ne (an enrichment factor of 3.50±0.30 for $^{22}$Ne; i.e., (abundance of $^{22}$Ne in detected signal)/(natural abundance of $^{22}$Ne)=32.4%/9.25%~3.5)). That is, the detected signal when the collector is at the maximum of the $^{22}$Ne diffraction peak (with angular width of 0.67°) is effectively enriched in $^{22}$Ne by a factor of about 3.5.

Figure 5:
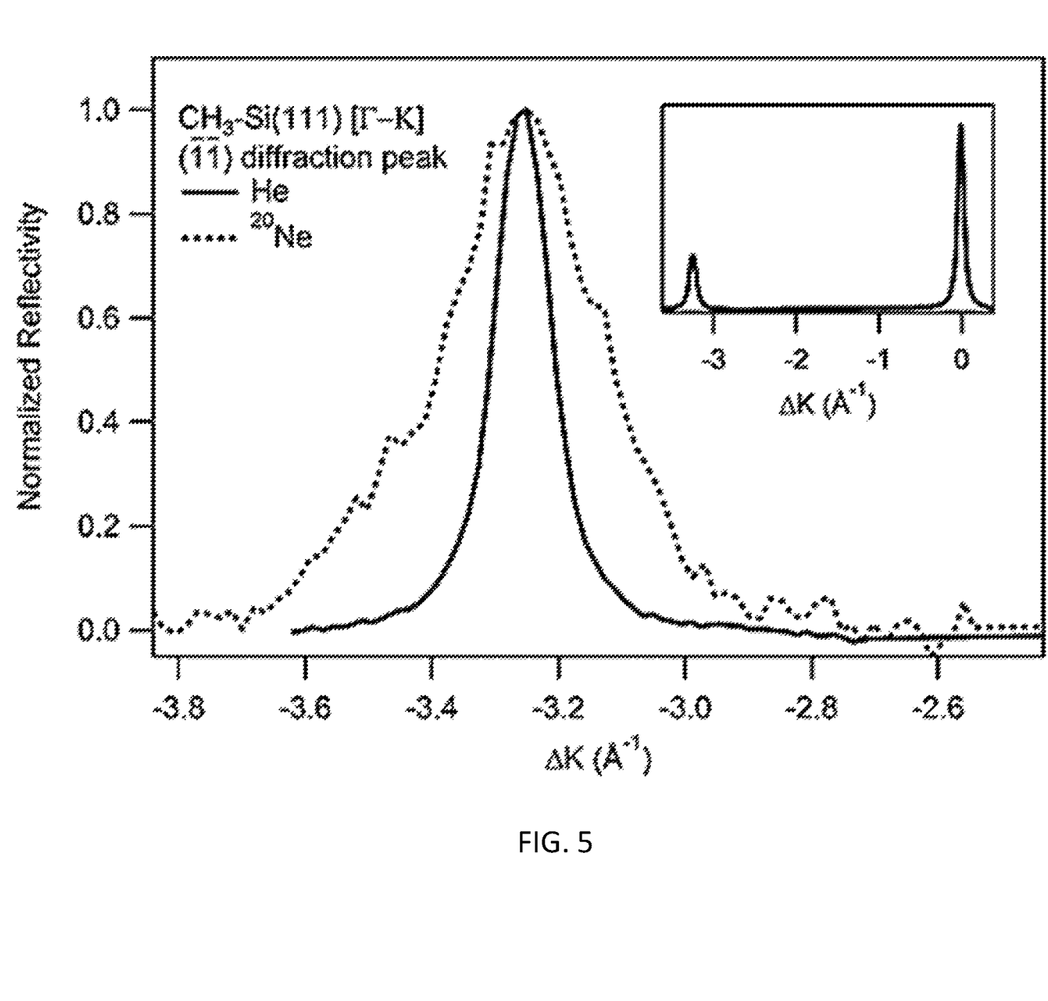
FIG. 5 shows helium (solid line) and $^{20}Ne$ (dashed line) diffraction spectra from $CH_3$—Si(111). Inset: wide angular range diffraction scan for He/$CH_3$—Si(111) demonstrating the high quality of the substrate used in these experiments.

While the partial overlap of the isotopes indicates that the angular separation of $^{20}$Ne and $^{22}$Ne is incomplete, FIG. 5 shows helium and neon scattering under similar incidence conditions and demonstrates that the angular width of the observed (11) diffraction peaks is a result of the velocity spread of the incident beam and not the instrumental resolution or surface quality. Because the final angle and momentum of a diffracted species are directly dependent on its incident momentum, the efficiency of isotopic separation via diffraction is limited by the velocity spread of the atomic beam, which in turn is a function of the source in which the beam is created. While a common method for narrowing the velocity distribution is seeding the beam with a light gas (e.g. He, $H_2$) (15, 17, 18), the increased average velocity of this mixture would bring the angular positions of the diffraction peaks closer together, limiting the degree of separation, as predicted by equation (1). However, a more straightforward solution would be the addition of an in-line pre-collision velocity selector which would directly lead to more complete angular separation of the two isotopes (19).

Velocity selection techniques can also be implemented after the atoms collide with the surface. For a given $\theta_f$ at which there is angular overlap between the $^{20}$Ne and $^{22}$Ne non-zeroth order diffraction peaks, the two isotopes will necessarily have different velocities, as required by equation (1). This is demonstrated in FIG. 6, which shows time-of-flight spectra for both isotopes at the midway point between their (11) diffraction peak maxima. The pronounced difference in arrival time between the two isotopes opens up the possibility for complete isotopic separation mediated by velocity selection techniques.

The practical throughput of diffractive isotope separation can be maximized by thoughtful consideration of the incidence parameters and the choice of diffracting surface. As established by equation (1), the angles at which atoms will scatter from a surface depend upon the incident wavevector of the atomic beam ($k_i$) and the spacing between diffraction peaks ($\Delta K$), which is in turn dependent on the real-space distance between atoms at the surface. The incident flux of an atomic beam can be concentrated into a smaller number of accessible diffraction channels by lowering the incident wavevector/beam velocity (e.g. by seeding in a heavier gas such as xenon) or increasing the angular spread between diffraction peaks by choosing a surface with a smaller lattice parameter, such as graphite (lattice constant=2.46 Å).

The choice of surface can also affect the relative flux scattered into various diffraction channels. Higher ratios of scattered intensity between non-zeroth order diffraction and specular peaks have been demonstrated to be correlated with increased surface corrugation (10, 20-22). Additionally, the amount of flux that is scattered diffusely from a surface is strongly affected by the surface hardness, which is quantified by the surface Debye temperature (14). When gases diffract from surfaces with high Debye temperatures, less of the incident flux is scattered into diffuse elastic channels due to the Debye-Waller effect than for soft surfaces, resulting in a more directed channeling of the incident beam into diffraction peaks.

CONCLUSION

The angular and temporal separation effects of supersonic molecular beam diffraction provide a promising isotope enrichment method that does not require ionization or laser excitation of the target isotope. The necessity of a supersonic expansion for this technique is demonstrated, and as a proof of concept natural abundance neon has been shown to diffract into separate, isotopically dependent diffraction lab frame angles. The experimental set-up may be adjusted to achieve maximum separation and throughput, with the velocity spread of the incident beam serving as the most determining factor in thorough separation. As atomic diffraction has been observed for species with masses as high as 50 amu(23), this isotope separation technique is applicable to a wide range of co-expanded atoms and molecules. Overall, separation of atoms and molecules into isotopically pure diffraction channels is an interesting and novel application of supersonic molecular beam assemblies.

REFERENCES

1. F. A. Lindemann, F. W. Aston, XLVIII. The possibility of separating isotopes. *Philos. Mag. Ser.* 6. 37, 523-534 (1919).
2. L. O. Love, Electromagnetic Separation of Isotopes at Oak Ridge: An informal account of history, techniques, and accomplishments. *Science.* 182, 343-52 (1973).
3. A. L. Yergey, A. K. Yergey, Preparative scale mass spectrometry: A brief history of the calutron. *J. Am. Soc. Mass Spectrom.* 8, 943-953 (1997).
4. T. Ruf et al., Thermal conductivity of isotopically enriched silicon. *Solid State Commun.* 115, 243-247 (2000).
5. G. Balasubramanian et al., Ultralong spin coherence time in isotopically engineered diamond. *Nat. Mater.* 8, 383-387 (2009).
6. K. M. Itoh, H. Watanabe, Isotope engineering of silicon and diamond for quantum computing and sensing applications. *MRS Commun.* 4, 143-157 (2014).
7. T. R. Mazur, B. Klappauf, M. G. Raizen, Demonstration of Magnetically Activated and Guided Isotope Separation. *Nat. Phys.* 10, 601-605 (2014).
8. P. A. Bokhan et al., *Laser Isotope Separation in Atomic Vapor* (2006).
9. J. B. Anderson, R. P. Andres, J. B. Fenn, Supersonic nozzle beams. *Adv. Chem. Phys.* 10, 275-317 (1966).
10. G. Boato, P. Cantini, L. Mattera, A study of the (001)LiF surface at 80 K by means of diffractive scattering of He and Ne atoms at thermal energies. *Surf Sci.* 55, 141-178 (1976).
11. B. Gans, P. A. Knipp, D. D. Koleske, S. J. Sibener, Surface dynamics of ordered Cu3Au(001) studied by elastic and inelastic helium atom scattering. *Surf Sci.* 264, 81-94 (1992).
12. D. D. Koleske, S. J. Sibener, Generation of pseudorandom sequences for use in cross-correlation modulation. *Rev. Sci. Instrum.* 63, 3852 (1992).
13. N. T. Plymale, Y. G. Kim, M. P. Soriaga, B. S. Brunschwig, N. S. Lewis, Synthesis, Characterization, and Reactivity of Ethynyl- and Propynyl-Terminated Si(111) Surfaces. *J. Phys. Chem. C.* 119, 19847-19862 (2015).
14. J. S. Becker, R. D. Brown, E. Johansson, N. S. Lewis, S. J. Sibener, Helium atom diffraction measurements of the surface structure and vibrational dynamics of CH(3)-Si (111) and CD(3)-Si(111) surfaces. *J. Chem. Phys.* 133, 104705 (2010).
15. K. J. Nihill et al., Experimental and theoretical study of rotationally inelastic diffraction of H2(D2) from methyl-terminated Si(111). *J. Chem. Phys.* 145, 84705 (2016).
16. H. Yu et al., Low-temperature STM images of methyl-terminated Si(111) surfaces. *J. Phys. Chem. B.* 109, 671-674 (2005).
17. N. Isa, K. D. Gibson, T. Yan, W. Hase, S. J. Sibener, Experimental and simulation study of neon collision dynamics with a 1-decanethiol monolayer. *J. Chem. Phys.* 120, 2417-2433 (2004).
18. G. Scoles, *Atomic and Molecular Beam Methods Volume I* (Oxford University Press, New York, 1988).
19. C. Szewc, J. D. Collier, H. Ulbricht, Note: A helical velocity selector for continuous molecular beams. *Rev. Sci. Instrum.* 81, 10-13 (2010).
20. A. Politano et al., Helium reflectivity and Debye temperature of graphene grown epitaxially on Ru(0001). *Phys. Rev. B.* 84, 35450 (2011).
21. K.-H. Rieder, W. Stocker, Observation of Pronounced Neon Diffraction from Low-Index Metal Surfaces. *Phys. Rev. Lett.* 52, 352-355 (1984).
22. M. W. Cole, D. R. Frankl, Atomic and molecular beam scattering from crystal surfaces in the quantum regime. *Surf. Sci.* 70, 585-616 (1978).
23. M. Minniti et al., Helium, neon and argon diffraction from Ru(0001). *J. Phys. Condens. Matter.* 24, 354002 (2012).
21. M. Minniti, C. Diaz, J. L. Fernandez Cunado, A. Politano, D. Maccariello, F. Martin, D. Farias, and R. Miranda, J. Phys. Condens. Matter 24, (2012).

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A method for separating isotopes, the method comprising:
   directing a supersonic beam characterized by an average velocity v and velocity distribution $\Delta v/v$, the beam comprising a first isotope and a second isotope, at a single-crystalline surface at an angle of incidence $\theta_i$ such that the first isotope elastically scatters from the surface with a peak angle $\theta_{f1}$ and the second isotope elastically scatters from the surface with a peak angle $\theta_{f2}$; and
   selectively collecting the scattered first isotope, the scattered second isotope, or both.

2. The method of claim 1, wherein the first and second isotope each have an atomic mass of 50 AMU or less.

3. The method of claim 1, wherein the first and second isotopes are independently selected from $^1$H, $^2$H, $^3$H, $^3$He, $^4$He, $^6$Li, $^7$Li, $^{10}$B, $^{11}$B, $^{12}$C, $^{13}$C, $^{14}$C, $^{14}$N, $^{15}$N, $^{16}$O, $^{17}$O, $^{18}$O, $^{24}$Mg, $^{25}$Mg, $^{26}$Mg, $^{28}$Si, $^{29}$Si, $^{30}$Si, $^{32}$S, $^{33}$S, $^{34}$S, $^{36}$S, $^{35}$Cl, $^{37}$Cl, $^{36}$Ar, $^{38}$Ar, $^{40}$Ar, $^{39}$K, $^{40}$K, $^{41}$K, $^1$H$^1$H, $^2$H$^2$H, $^1$H$^2$H, $^{12}$CH$_4$, $^{13}$CH$_4$, $^{14}$CH$_4$, $^{14}$N$^{14}$N, $^{15}$N$^{15}$N, $^{16}$O$^{16}$O, $^{18}$O$^{18}$O, $^{16}$O$^{18}$O, $^6$Li$^1$H, $^7$Li$^1$H, $^{35}$Cl$^1$H, $^{37}$Cl$^1$H, $^{14}$N$^1$H$_3$, $^{15}$N$^1$H$_3$, $^1$H$^{19}$F, $^2$H$^{19}$F, $^{28}$Si$^1$H$_4$, $^{29}$Si$^1$H$_4$, and $^{30}$Si$^1$H$_4$.

4. The method of claim 1, wherein the velocity distribution $\Delta v/v$ is no more than 10%.

5. The method of claim 1, wherein the single-crystalline surface is characterized by a surface atom spacing of no more than 7.5 Å.

6. The method of claim 1, wherein the single-crystalline surface is characterized by a Debye temperature of at least 100 K.

7. The method of claim 1, wherein the single-crystalline surface is selected from diamond, hydrogen terminated diamond, graphite, graphene, CH$_3$—Si(111), CH$_3$—Ge(111), LiF, NaCl, GaAs, Ni, Pt, Au, O or H covered crystalline metal, and crystallized self-assembled alkane thiol.

8. The method of claim 1, wherein the step of selective collection is carried out by positioning a collection surface at $\theta_{f1}$, a collection surface at $\theta_{f2}$, or both.

9. The method of claim 1, wherein the method is characterized by an enrichment factor of at least 2 for the scattered first isotope, the scattered second isotope, or both.

10. An apparatus for separating isotopes, the apparatus comprising:
    a source configured to provide a supersonic beam characterized by an average velocity v and velocity distribution $\Delta v/v$, the beam comprising a first isotope and a second isotope, wherein the apparatus is further configured to direct the supersonic beam at a single-crystalline surface at an angle of incidence $\theta_i$ such that the first isotope elastically scatters from the surface with a peak angle $\theta_{f1}$ and the second isotope elastically scatters from the surface with a peak angle $\theta_{f2}$; and
    a collector configured to selectively collect the scattered first isotope, the scattered second isotope, or both, as a function of angle $\theta_f$ or time-of-flight, or both.

11. The apparatus of claim 10, wherein the first and second isotope each have an atomic mass of 50 AMU or less.

12. The apparatus of claim 10, wherein the first and second isotopes are independently selected from $^1$H, $^2$H, $^3$H, $^3$He, $^4$He, $^6$Li, $^7$Li, $^{10}$B, $^{11}$B, $^{12}$C, $^{13}$C, $^{14}$C, $^{14}$N, $^{15}$N, $^{16}$O, $^{17}$O, $^{18}$O, $^{24}$Mg, $^{25}$Mg, $^{26}$Mg, $^{28}$Si, $^{29}$Si, $^{30}$Si, $^{32}$S, $^{33}$S, $^{34}$S, $^{36}$S, $^{35}$Cl, $^{37}$Cl, $^{36}$Ar, $^{38}$Ar, $^{40}$Ar, $^{39}$K, $^{40}$K, $^{41}$K, $^1$H$^1$H, $^2$H$^2$H, $^1$H$^2$H, $^{12}$CH$_4$, $^{13}$CH$_4$, $^{14}$CH$_4$, $^{14}$N$^{14}$N, $^{15}$N$^{15}$N, $^{16}$O$^{16}$O, $^{18}$O$^{18}$O, $^{16}$O$^{18}$O, $^6$Li$^1$H, $^7$Li$^1$H, $^{35}$Cl$^1$H, $^{37}$Cl$^1$H, $^{14}$N$^1$H$_3$, $^{15}$N$^1$H$_3$, $^1$H$^{19}$F, $^2$H$^{19}$F, $^{28}$Si$^1$H$^4$, $^{29}$Si$^1$H$^4$, and $^{30}$Si$^1$H$_4$.

13. The apparatus of claim 10, wherein the velocity distribution $\Delta v/v$ is no more than 10%.

14. The apparatus of claim 10, further comprising the single-crystalline surface wherein the single-crystalline surface is characterized by a surface atom spacing of no more than 7.5 Å.

15. The apparatus of claim 10, further comprising the single-crystalline surface wherein the single-crystalline surface is characterized by a Debye temperature of at least 100 K.

16. The apparatus of claim 10, further comprising the single-crystalline surface wherein the single-crystalline sur-face is selected from diamond, hydrogen terminated diamond, graphite, graphene, $CH_3$—Si(111), $CH_3$—Ge(111), LiF, NaCl, GaAs, Ni, Pt, Au, O or H covered crystalline metal, and crystallized self-assembled alkane thiol.

17. The apparatus of claim 10, wherein the collector comprises a first collection surface positioned at $\theta_{f1}$ and a second collection surface positioned at $\theta_{f2}$.

18. The apparatus of claim 10, wherein the apparatus is characterized by the ability to provide an enrichment factor of at least 2 for the scattered first isotope, the scattered second isotope, or both.

* * * * *